United States Patent
Conaway et al.

[19]

[11] Patent Number: 6,062,845
[45] Date of Patent: May 16, 2000

[54] TAKE-OUT MECHANISM FOR BLOW MOLDING MACHINE

[75] Inventors: John H. Conaway, York; David N. Fiorani, Jacobus; John M. Mathy, Jr., Stewartstown, all of Pa.

[73] Assignee: Graham Engineering Corporation, York, Pa.

[21] Appl. No.: 09/044,548

[22] Filed: Mar. 19, 1998

[51] Int. Cl.[7] .................................................. A01J 21/00
[52] U.S. Cl. ........................ 425/444; 198/375; 198/409; 198/433; 198/468.4; 414/568; 414/728; 414/763; 425/537
[58] Field of Search .................................. 425/537, 444; 414/568, 728, 737, 763; 198/432, 433, 379, 468.4, 471.1, 375, 409

[56] References Cited

U.S. PATENT DOCUMENTS

| | | | |
|---|---|---|---|
| 3,570,058 | 3/1971 | Heinig et al. | 425/537 |
| 3,596,315 | 8/1971 | Yoshikawa et al. | 425/527 |
| 3,767,747 | 10/1973 | Uhlig | 425/538 |
| 3,778,213 | 12/1973 | Di Settembrini | 425/532 |
| 3,781,395 | 12/1973 | Uhlig | 264/530 |
| 3,949,860 | 4/1976 | Bilodeau | 198/470.1 |
| 3,978,184 | 8/1976 | Dybala et al. | 425/534 |
| 3,981,667 | 9/1976 | Bilodeau | 198/443 |
| 4,025,261 | 5/1977 | Rutkowski et al. | 425/139 |
| 4,213,750 | 7/1980 | Kubota et al. | 425/531 |
| 4,479,771 | 10/1984 | Slat et al. | 425/503 |
| 4,498,854 | 2/1985 | Ross | 425/116 |
| 4,549,863 | 10/1985 | Bourgeois | 425/522 |
| 4,585,408 | 4/1986 | Darr | 425/171 |
| 4,679,997 | 7/1987 | Plenzler et al. | 425/534 |
| 4,752,206 | 6/1988 | Nowicki et al. | 425/537 |
| 4,886,443 | 12/1989 | Klinedinst et al. | 425/537 |
| 4,902,217 | 2/1990 | Martin et al. | 425/537 |
| 5,308,237 | 5/1994 | Kieran | 425/437 |
| 5,421,447 | 6/1995 | Ruth et al. | 198/377 |
| 5,569,476 | 10/1996 | Van Manen et al. | 425/444 |
| 5,665,404 | 9/1997 | Weber et al. | 425/503 |
| 5,681,597 | 10/1997 | Aguilar et al. | 425/537 |
| 5,759,593 | 6/1998 | Weber et al. | 425/503 |

FOREIGN PATENT DOCUMENTS

| | | |
|---|---|---|
| 0 334 468 | 9/1989 | European Pat. Off. . |
| 1 461 517 | 11/1966 | France . |
| 2 000 192 | 8/1969 | France . |
| 3 334 643 | 6/1985 | Germany . |

*Primary Examiner*—Robert Davis
*Attorney, Agent, or Firm*—Thomas Hooker, P.C.

[57] ABSTRACT

A take-out mechanism for removing sets of blow molded bottles from a blow mold includes a rotary turret, a take-away conveyor and a drive for moving the turret between the blow mold and the take-away conveyor. The turret has a number of sides with a plurality of vacuum plugs extending from each side. The drive moves the turret toward the mold to extend a set of plugs on one side of the turret into mold cavities and vacuum-capture bottles molded in the cavities. After opening of the mold, the turret is lowered and rotated 90° to position the vacuum-held bottles at the infeed end of the take-away conveyor. Rotation of the turret positions a second set of plugs facing a second mold moved to the take-out position. Subsequent rapid retraction of the turret moves the set of removed bottles into the take-away conveyor and powers the conveyor to receive the bottles while maintaining orientation between individual bottles. The turret is raised to remove the plugs from the bottles held in the conveyor and then rapidly extended back to the next mold to position the second set of plugs in bottles in the mold.

20 Claims, 5 Drawing Sheets

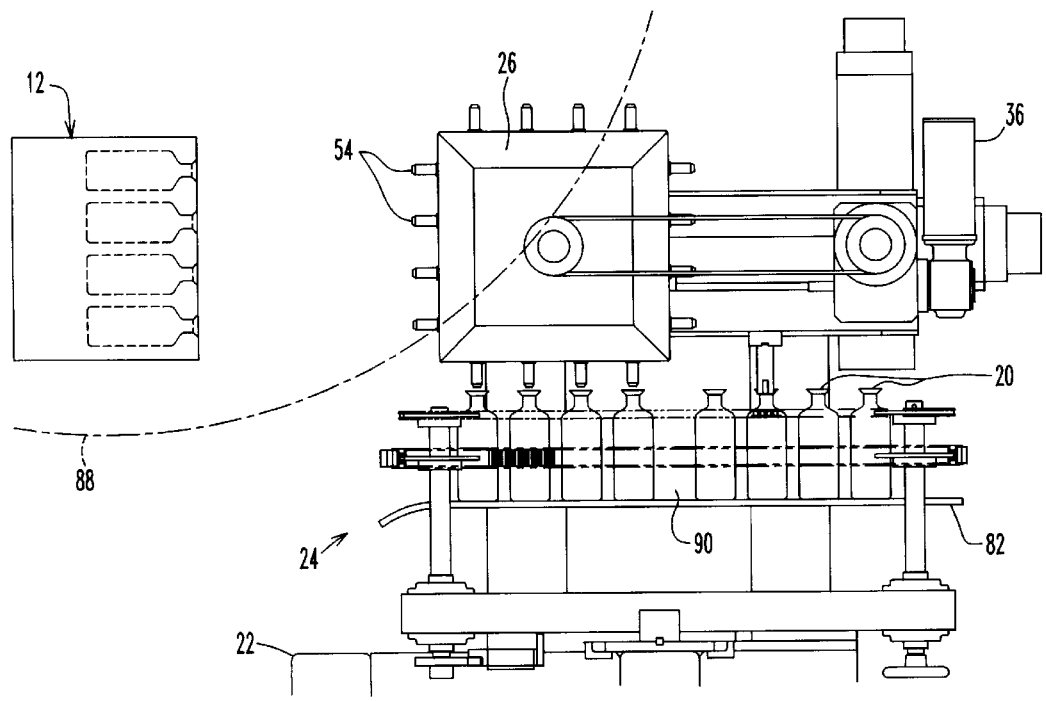
FIG. 6
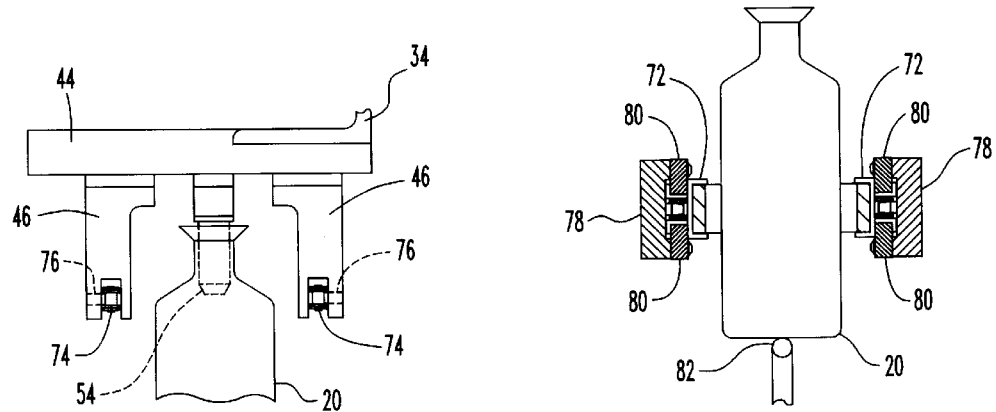
FIG. 7
FIG. 8

TAKE-OUT MECHANISM FOR BLOW MOLDING MACHINE

FIELD OF THE INVENTION

The invention relates to take-out mechanisms used with blow molding machines for removing plastic bottles from molds in which the bottles are blown, placing the bottles in a take-away conveyor and transporting the bottles away from the blow molding machine.

DESCRIPTION OF THE PRIOR ART

Modern blow molding machines are used with take-out mechanisms which remove the bottles from molds. The bottles are conventionally moved to a trim station where flash formed during blow molding is removed from the bottles and the bottles are finished as required. Some blow molding machines use multi-cavity molds and mold sets of bottles during each cycle of operation.

It is conventional to remove a bottle from a single cavity blow mold using a vacuum plug inserted into the neck of the bottle. However, conventional take-out mechanisms cannot rapidly and reliably remove sets of blow molded bottles from plural cavity molds and place the bottles in a take-away conveyor while maintaining the orientation of the bottles in the sets.

Thus, there is a need for a reliable high speed take-out mechanism for simultaneously removing sets of blow molded plastic bottles from plural cavity molds and placing these bottles in a take-away conveyor for transport as a set from blow molding machine for subsequent processing.

SUMMARY OF THE INVENTION

The invention is a high speed take-out mechanism for removing sets of bottles blown in a plural cavity mold from the mold and placing the sets of bottles in a take-away conveyor without disturbing the relative positions of the bottles during removal and transport along the conveyor. The take-out mechanism operates at a high production rate and is capable of removing a set of bottles from a mold every two seconds. The mechanism is particularly adapted for removing sets of blow molded bottles from a rotary blow molding machine of the type disclosed in co-pending U.S. patent application for "Rotary Blow Molding Machine and Method," Ser. No. 08/797,936, filed Feb. 12, 1997 and now U.S. Pat. No. 5,840,349, assigned to Graham Engineering Corporation of York, Pa., assignee of the present application.

The take-out mechanism engages the necks of the bottles in the mold and transfers the bottles from the mold to a take-away conveyor. Complicated tooling required to engage a particular size and shape bottle is not required. The mechanism is easily modified to take out different shaped bottles.

Other objects and features of the invention will become apparent as the description proceeds, especially when taken in conjunction with the accompanying drawings illustrating the invention, of which there are five sheets and one embodiment.

DESCRIPTION OF THE DRAWINGS

FIGS. 4, 5 and 6 are views similar to FIG. 1 illustrating operation of the mechanism; and FIGS. 7 and 8 are sectional views along lines 7—7 and 8—8, respectively, of FIG. 1.

DESCRIPTION OF THE PREFERRED EMBODIMENT

Figure 1:
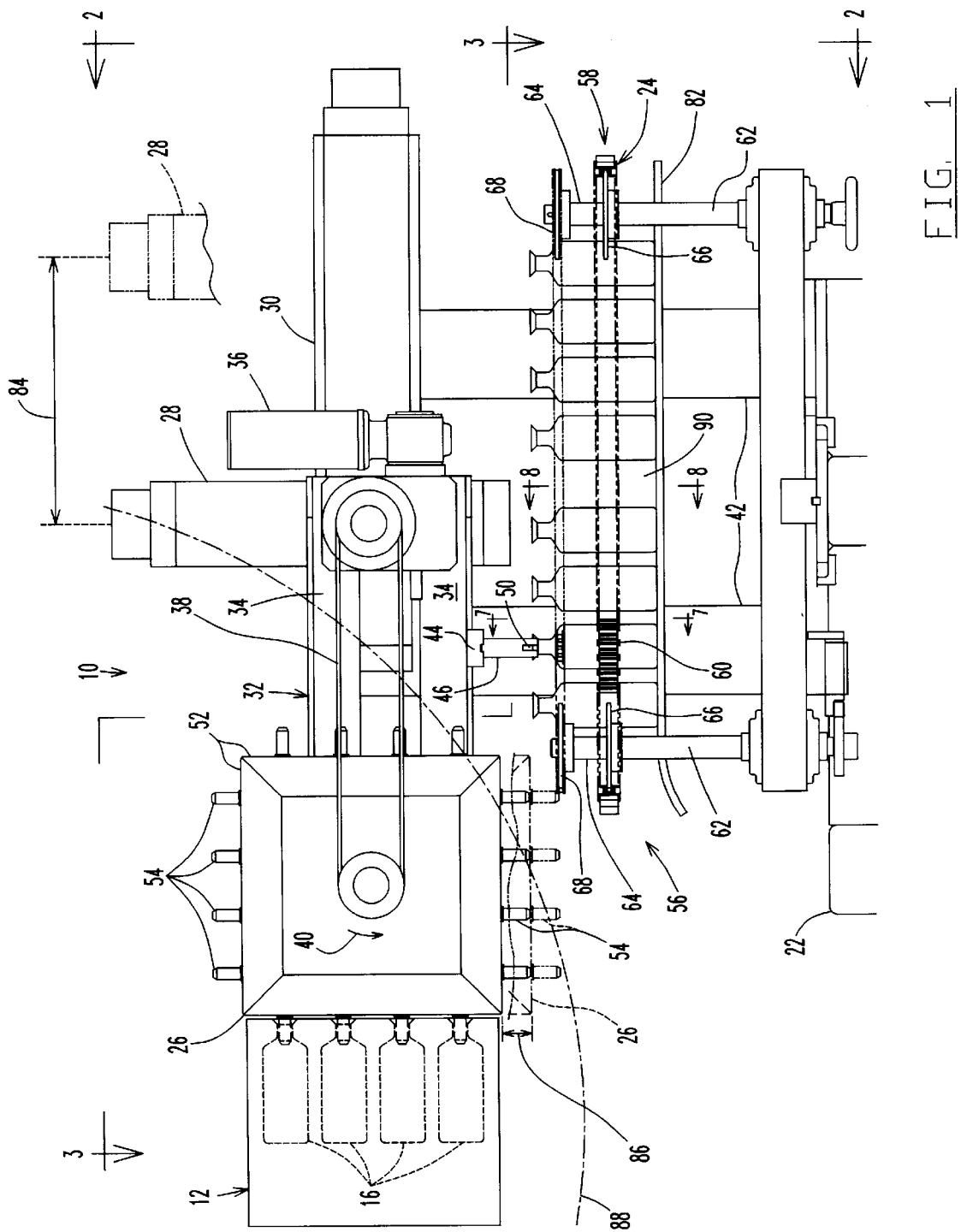
FIG. 1 is a side view of the take-out mechanism.

Take-out mechanism 10 operates to remove a set of bottles blown in multi-cavity blow mold 12 and rapidly and reliably place the bottles in a take-away conveyor without changing the orientation of the bottles for discharge to a further conveyor. Mold 12 is part of a blow molding machine, which may be a rotary blow molding machine or other type of blow molding machine. As illustrated, mold 12 includes two like mold sections 14 defining four bottle cavities 16 with open necks 18 spaced vertically along the side of the mold facing the take-out mechanism at the interface between the sections. During blow molding, sets of open necked blow molded bottles 20 are formed in cavities 16 and are moved with the mold to a take-out position shown in FIG. 1 for removal by mechanism 10. The mold 12 is moved to the take-out position free of mechanism 10. Flash, if any, on bottles 20 is not illustrated.

Mechanism 10 includes a base 22, a bottle take-away conveyor 24 on the base and a bottle transfer turret 26 for transferring sets of blow molded bottles 20 from mold 12 to conveyor 24. A drive for moving the turret 26 includes a horizontal slide drive 30 mounted on base 22 and a vertical slide drive 28 mounted on the horizontal drive. Vertical drive 28 supports a frame 32 including two horizontal rails 34 with turret 26 rotatably mounted on the end of the frame adjacent mold 12 and a rotary drive 36 mounted on the end of the frame away from the mold. Drive 36 is connected to the turret by belt 38. When actuated, drive 36 rotates turret 26 90° in the direction of arrow 40 shown in FIG. 1. Posts 42 support horizontal slide drive 30 above base 22. Conveyor 24 is supported by base 22 as shown in FIGS. 1 and 2.

Transverse support arm 44 is secured to the bottom of lower rail 34 between turret 26 and drive 36. A pair of spaced, like drive fingers 46 are mounted on arm 44 and extend downwardly from the arm. As illustrated in FIG. 2, turret 26 is located centrally between the drive fingers 46. Slots 48 formed in the lower ends of fingers 46 extend in the direction of movement of the horizontal slide drive 30. See FIG. 2. Transverse slots 50 are also formed in the lower ends of fingers 46 and extend through slots 48. See FIG. 1. The intersecting slots 48 and 50 define four corner posts at the lower end of each finger 46.

Square turret 26 has four like sides 52 with four cylindrical vacuum plugs 54 spaced along and extending outwardly from each side. The spacing between plugs 54 is the same as the spacing between the necks 18 in mold 14. Plugs 54 fit snugly in the necks of the bottles blow molded in cavities 16. Axial vacuum passages (not illustrated) extend from the outer ends of plugs 54 into a vacuum manifold (not illustrated) in turret 26. The manifold includes appropriate valving which permits connecting the vacuum passages in the plugs on each side of the turret to a vacuum source and disconnected the passages from the vacuum source as required during operation of take-out mechanism 10. As shown in FIG. 2, turret 26 is narrow, having a thickness only slightly greater than the diameter of plugs 54. The narrow turret is freely movable into the gap between mold sections 14 when opened.

Figure 2:
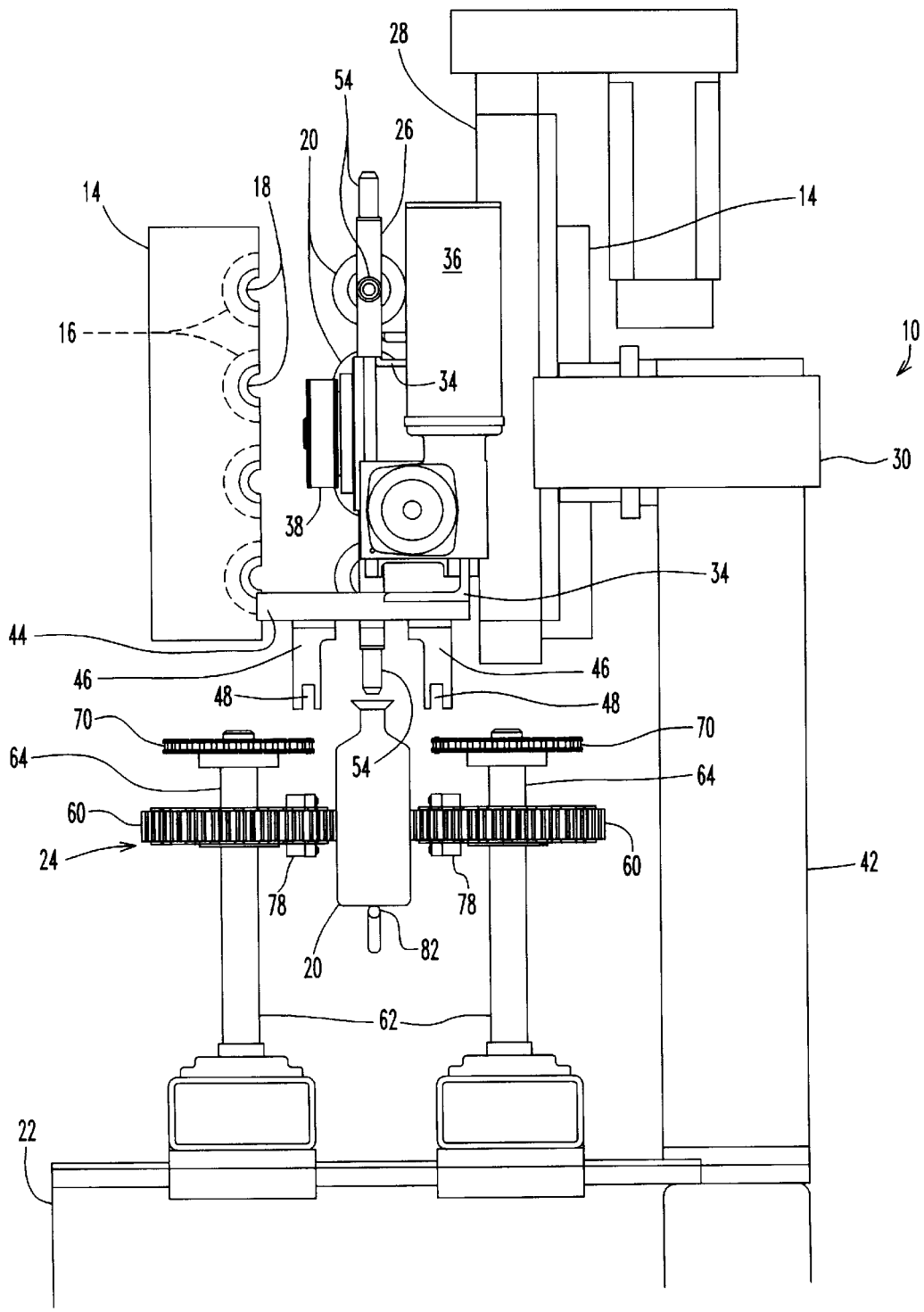
FIG. 2 is an end view taken along line 2—2 of FIG. 1.

As illustrated in FIG. 1, bottle take-away conveyor 24 is located below frame 32 and includes an infeed end 56 adjacent mold 12 and a discharge end 58 away from mold 12. The conveyor includes a pair of opposed endless bottle conveying belts 60 extending between ends 56 and 58. A support post 62 is located at the infeed and discharge ends of each conveyor belt 60. Rotatable hubs 64 mounted on the upper ends of posts 62 each include a lower conveyor belt sprocket 66 and an upper drive chain sprocket 68. See FIG. 1. Conveyor belts 60 are wound around the two sprockets 66 on each side of the conveyor. Drive chains 70 are wound around the two sprockets 68 on each side of the conveyor, above belts 60. Sprockets 66 and 68 are the same diameter so that the conveyor belts and chains move at the same speed.

Figure 3:
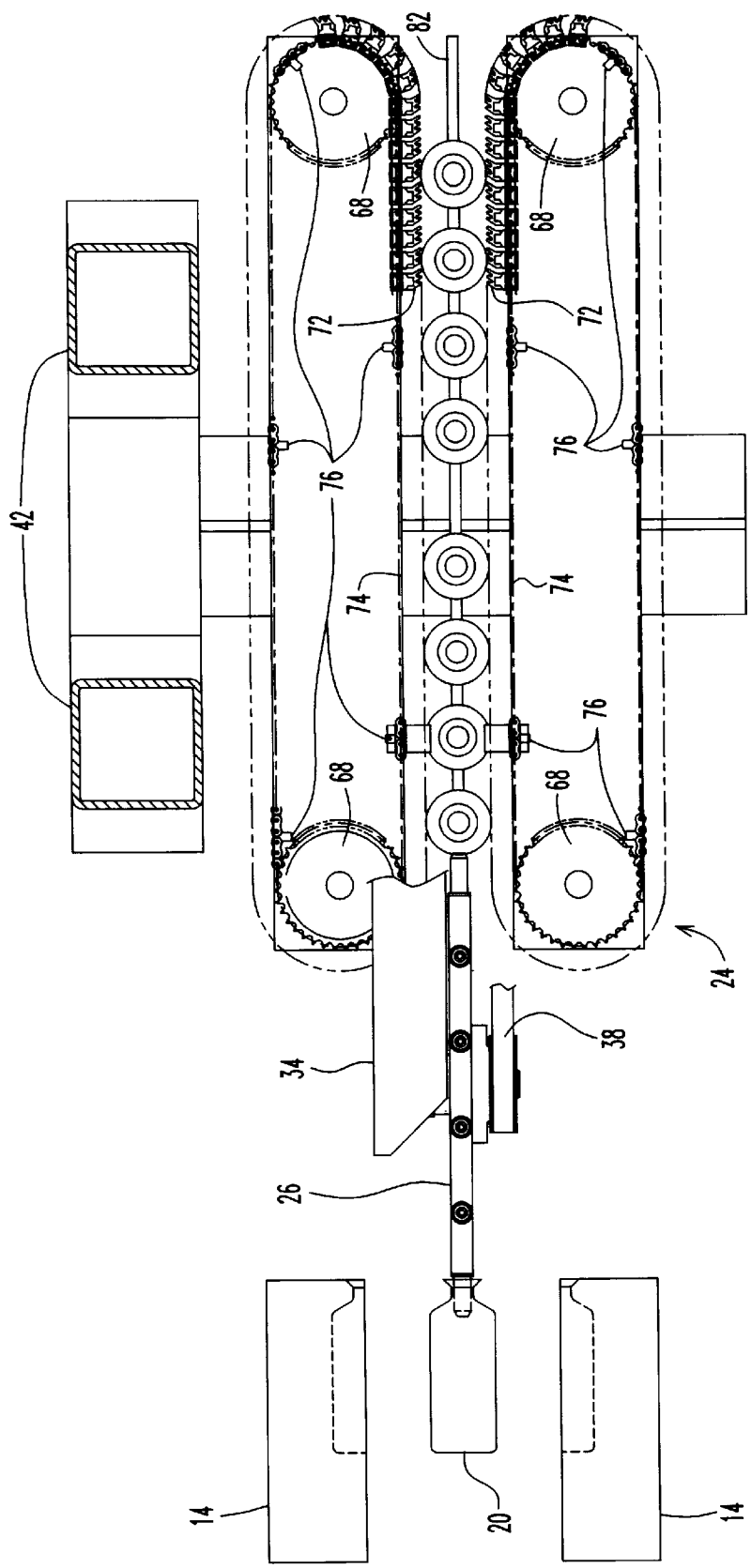
FIG. 3 is a partially broken away view taken along line 3—3 of FIG. 1.

Each bottle conveying belt 60 includes an inner conveying run 72 extending from the infeed end of the conveyor to the discharge end of the conveyor. Each drive chain 70 includes an inner drive run 74 extending from the infeed end of the conveyor to the discharge end of the conveyor and located above a run 72. A plurality of drive lugs 76 are secured to each drive chain 70 at regular intervals along the length of the chain. Bottle conveyor belts 60 include a number of links having resilient bottle gripping fingers as shown in FIG. 3. The inner runs 72 of belt 60 are spaced apart a distance slightly less than the diameters of bottles 20 so that the bottles are resiliently held between the two belts and are moved downstream upon downstream movement of the inner runs 72 of belts 60.

As shown in FIG. 8, a backup plate 78 is located outwardly of the inner run 72 of each bottle conveying belt 60. Plates 78 extend the length of the inner runs 72 and prevent outward bowing of the runs to assure that bottles 20 are held between the belts and are conveyed from the infeed end to the discharge end of the conveyor with like movement of the belts 60. The downstream runs 72 are held on plates 78 by gibbs 80 which are attached to plates 78 and overly top and bottom flanges on belts 60. Plates 78 are mounted on frame 22.

A bottle support rail 82 is located between and below the inner runs 72 of belt 60 to guide the lower ends of bottles 20 on the conveyor. As shown in FIG. 2, support rail 82 may be located centrally below the bottles. If the bottles 20 carry tail flash then the rail 82 may be offset a distance to one side of the tail flash. Alternatively, a pair of offset rails may be provided with the tail flash located between the rails.

As illustrated in FIG. 1, horizontal slide drive 30 moves vertical slide drive 28, frame 32, turret 26 and rotary drive 38 horizontally between an extended position shown in solid lines in FIG. 1 and a retracted position indicated in dashed lines, along a stroke 84 having a length greater than a length of a set of bottles 20, including any side flash, removed from mold 12 by apparatus 10.

Vertical slide drive 28 moves frame 32, turret 26 and rotary drive 38 through a vertical stoke 86 which is slightly greater than the length of the cylindrical vacuum plugs 64 inserted into the necks of the bottles 20 held in bottle cavities 16 of mold 12.

Take-out mechanism 10 cycles repetitively to remove sets of four blow molded bottles 20 from molds 12 indexed to the take-out station as shown in FIG. 1, place the sets of bottles in the take-away conveyor and actuate the conveyor to move sets of bottles downstream and away from molding machine. Actuation of the conveyor during one cycle moves a prior set of bottles out of the discharge end of the conveyor for processing, which typically includes deflashing and trimming as required.

A complete cycle of operation of take-out mechanism 10 will now be described starting with the mechanism in the position shown in FIG. 6. This figure illustrates the mechanism 10 with the horizontal slide drive 30 retracted and the vertical slide drive 28 raised. Turret 26 is located above a set of four bottles 20 which in the prior cycle of operation were removed from a mold 12 and placed in the infeed end of take-away conveyor 24. The vacuum plugs used to grip and convey the set of bottles 20 are located a short distance above the necks of the bottles. The vacuum system for turret 26 has disconnected these plugs from the vacuum source. The open mold 12 which, when closed, previously conveyed the blow molded bottles to the take-out position has been moved from the take-out position by the blow molding machine. The mold may be rotated away from the take-out position along a path indicated by arcuate line 88 or along a different path, depending upon the type of blow molding machine.

After another closed mold 12 with four molded bottles 20 in cavities 16 has been moved to the take-out position with mechanism 10 in a position of FIG. 6, the horizontal slide drive is rapidly extended to move the turret 26 without rotation to the extended position shown in FIG. 1 and seat the vacuum plugs 54 on the front side of the turret in the necks of the bottles in cavities 16 in the mold. After extension of the horizontal slide drive, the vacuum source is connected to the plugs inserted into the bottle necks to reduce the pressure in the bottles and form vacuum connections holding the bottles on the plugs. The blow molding machine then opens the mold by moving the mold sections 14 apart as shown in FIG. 3. Bottles 20 are supported on plugs 54, free of the mold sections. The relative positions of the bottles are maintained.

Figure 4:
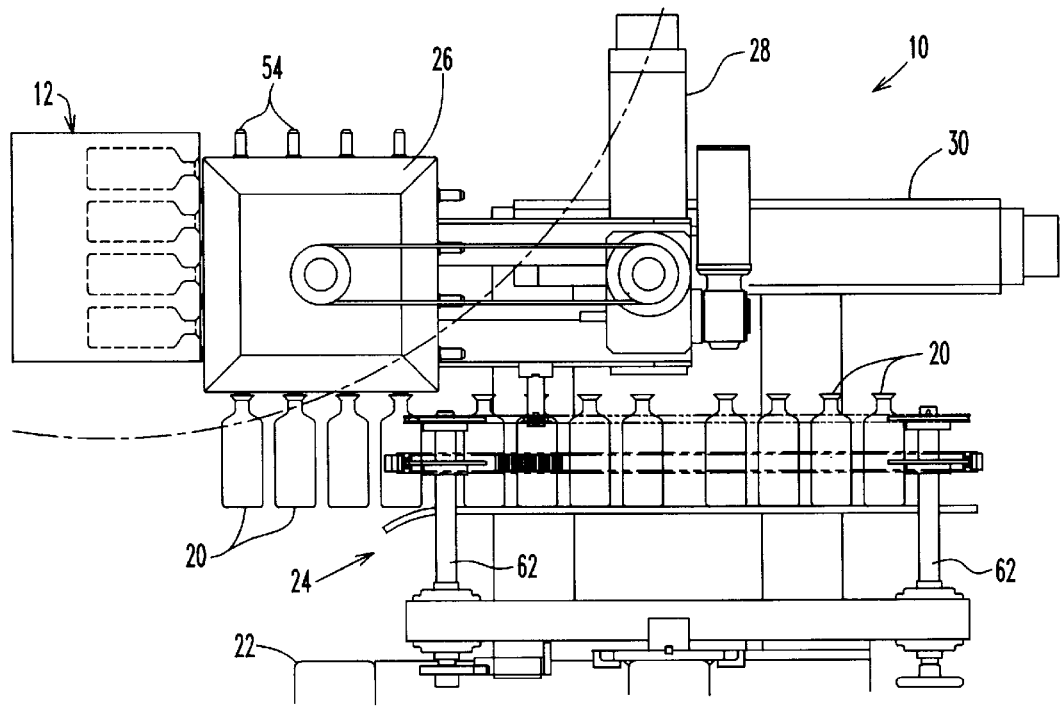

The vertical slide drive and rotary drive 36 are then actuated simultaneously to lower the horizontal slide drive and rotate the turret 26 90° in the direction of arrow 40 thereby rotating the set of bottles 20 down and away from the mold and translating the set of bottles down a short distance to the position of FIG. 4. The bottle removed from the lowest cavity 16 of mold 12 is located adjacent the infeed end 56 of take-away conveyor 24.

Lowering of frame 32 lowers the two drive fingers 46 from the position of FIG. 2 to the position of FIG. 7 where the lower ends of the fingers are fitted over the inner runs 74 of drive chain 70 and two drive lugs 76. Runs 74 extend through slots 48 and drive lugs 76 are positioned in transverse slots 50, thereby forming drive connections between the fingers 46 and chains 70.

Next, the horizontal slide drive is rapidly retracted to move the set of four bottles extending down from the turret into the take-away conveyor 24 and into engagement with the inner runs 72 of belts 60. The bottoms of the bottles engage rail 82. At the same time as the bottles are moved into the conveyor the retraction of the horizontal slide drive moves fingers 46 toward the discharge end of the conveyor thereby moving the inner runs 74 of the drive chain downstream and, correspondingly, moving the inner runs of the bottle conveying belts downstream at the same speed the bottles are moved into the conveyor. The belts receive the bottles without relative movement as the bottles are moved into the conveyor. The spacing between the set of bottles is maintained. Turret 26 is not rotated during the rapid retraction of drive 30.

The stroke 84 of the horizontal drive is slightly greater than the maximum distance between the outermost bottles in the set, including flash, if any, to assure that sets of bottles on the take-away conveyor do not contact each other. The spacing 90 between adjacent sets of bottles on the conveyor is greater than the spaces between adjacent bottles in the set.

Retraction of drive 30 discharges the bottles held in the conveyor from the conveyor as a set.

Figure 5:
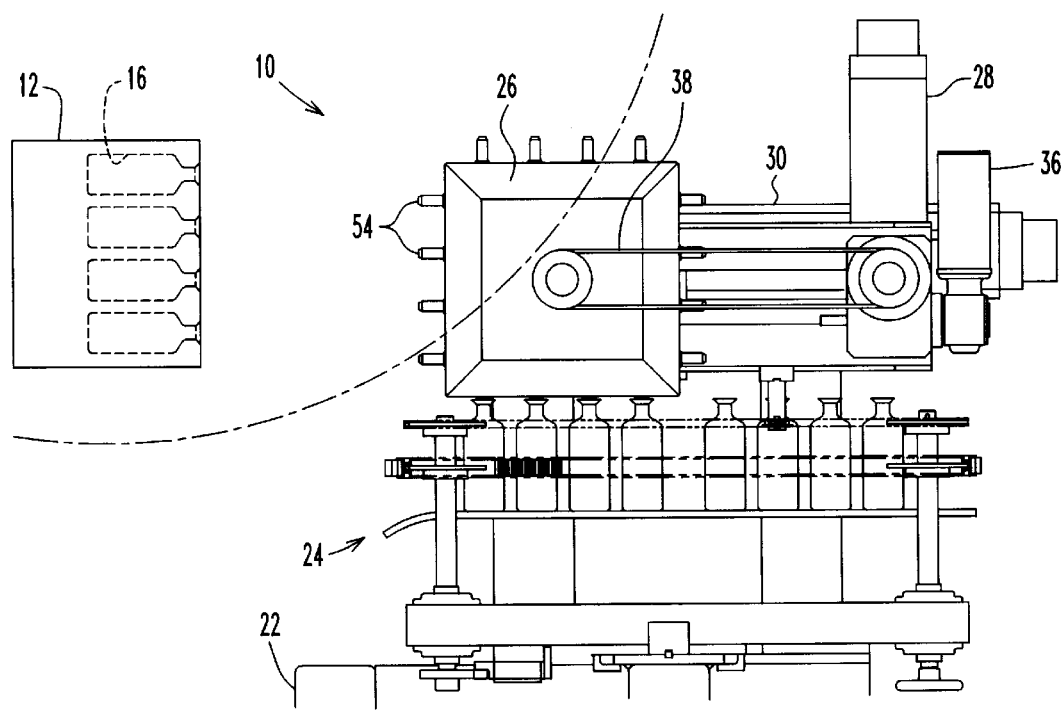

After the horizontal drive has been retracted as described, take-out mechanism 10 is in the position shown in FIG. 5 with the set of bottles removed from the mold in proper alignment in the infeed end of conveyor 24. Each bottle is held in place between belts 60. A valve in the vacuum manifold system is then actuated to disconnect the plugs 54 inserted in the necks of the bottles from the vacuum source to release the vacuum connection between the plugs and the bottles.

Vertical slide drive 28 is then actuated to raise the turret 26 and return apparatus 10 to the position of FIG. 6, and complete a cycle of operation. The set of plugs 54 used to carry the bottles to conveyor 24 is moved up and out of the necks of the bottles. A second set of plugs faces the next mold in the take-out position.

Actuation of the vertical drive to raise the horizontal drive and turret from the position of FIG. 5 to the position of FIG. 6 moves fingers 46 up and out of engagement with drive chains 70 so that the take-away conveyor 24 is dwelled until the next cycle of operation when the vertical slide drive again lowers the fingers into engagement with the next upstream lugs on the drive chains and the horizontal drive is retracted. Thus, the inner runs of bottle conveyor belts 60 are moved downstream intermittently during retraction of the horizontal slide drive 30 only.

The open mold sections 14 are removed from the take-out position during cycling of mechanism 10 and a closed mold with a new set of blow molded bottles in cavities 16 is moved to the take-out position. The horizontal slide drive 30 is then quickly extended to position the second set of vacuum plugs in the necks of the bottles in the mold as previously described. The second set of plugs 54 is located on the turret 90° clockwise from the set of vacuum plugs used to transport the first set of bottles to conveyor 24. See FIG. 1. During each cycle of operation of mechanism 10 the turret is rotated 90° in the direction of arrow 40 once as the vertical drive is lowered so that successive turret sides 52 face a mold 12 and successive sets of plugs extending from the successive sides are rapidly extended into the necks of bottles in the molds.

Current blow molding machines produce bottles at a high production rate. The take-out mechanism 10 cycles very rapidly and is capable of removing sets of bottles from successive molds and reliably discharging the bottles from the take-away conveyor 24 in a two second cycle time. When mechanism 10 is used with a two second blow molding machine having four cavity molds, the mechanism discharges 7,200 bottles per hour.

The provision of a four sided turret facilitates rapid operation of the take-out mechanism. Rotation of the turret, which takes time, occurs only once per cycle. The turret does not rotate during rapid extension and retraction of the horizontal slide drive 30, thereby reducing cycle time.

Mechanism 10 engages bottles in a closed mold by inserting vacuum plugs into the necks of the bottles. The engagement between the bottles and the plugs is independent of the shape of the bottles and permits ready changeover of mechanism 10 to accommodate different mold spacings and bottle shapes. It is a straight forward matter to vary the spacing, diameter and number of vacuum plugs located on each side of the turret. Complicated take-out tooling engaging the sides of the bottles is not required. The width and height of conveyors 24 are also adjustable.

Additionally, mechanism 10 removes bottles from the blow mold and places the bottles on the take-away conveyor reliably, independently of the presence of flash. Any flash, including side flash and tail flash, on the bottles is retained and is conveyed with the bottles as they are discharged from the take-away conveyor. The conveyor moves the bottles as a group toward the discharge end and discharges the bottles as a group for subsequent processing, without moving individual bottles relative to each other. In this way, the bottles and flash, if any, are delivered as a group for subsequent processing.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. A take-out mechanism for removing a plurality of bottles from a multi-cavity mold, the mechanism comprising a rotary member having a plurality of vacuum plugs spaced along and extending outwardly from one side thereof, a bottle take-away conveyor having opposed infeed and discharge ends, said infeed end located approximate a mold and said discharge end located away from the mold, a first drive to move the member to a mold and extend the plugs into bottles in the mold, a second drive to rotate the member and move the vacuum plugs and bottles on the plugs to a position adjacent the infeed end of the bottle take-away conveyor, said first drive also to move the member away from the mold along the take-away conveyor and position the bottles on the vacuum plugs in the bottle take-away conveyor, a third drive to move the bottle take-away conveyor from the infeed end toward the discharge end as bottles are moved into the conveyor, and a fourth drive to move the member to one side of the bottle take-away conveyor and remove the plugs from bottles in the conveyor.

2. A take-out mechanism as in claim 1 wherein said member comprises a rotary turret having a plurality of sides and a plurality of vacuum plugs extending outwardly from each side of the turret.

3. A take-out mechanism as in claim 2 wherein said turret includes four sides and said second drive to rotate said turret 90°.

4. A take-out mechanism as in claim 2 wherein the first and fourth drives move the turret along perpendicular, linear strokes.

5. A take-out mechanism as in claim 4 wherein the stroke of the first drive is longer than the stroke of the fourth drive.

6. A take-out mechanism as in claim 4 wherein the vacuum plugs have a bottle insertion length and wherein the stroke of the fourth drive is greater than the insertion length.

7. A take-out mechanism as in claim 1 wherein the stroke of the first drive is greater than the width of the bottles on said vacuum plugs and any flash.

8. A take-out mechanism as in claim 1 including a base, one of said first and third drives comprising a horizontal drive and the other of said first and third drives comprising a vertical drive and one of said such drives supporting said turret and the other of said such drives mounted on said base and supporting such one of such drives.

9. A take-out mechanism as in claim 1 wherein said conveyor includes an endless belt and an element for driving the belt, said fourth drive including a drive finger movable into and out of engagement with the element.

10. A take-out mechanism for removing plastic bottles from molds, the take-out mechanism comprising a rotary turret having a plurality of sides, a plurality of vacuum plugs extending from each side of the turret, a first drive to move a first side of the turret against a mold and extend the plugs on the first side into bottles in the mold, a second drive to rotate the turret through an angle and move bottles on such plugs to a position adjacent the infeed end of a take-away conveyor, a take-away conveyor having such infeed end, a discharge end and bottle transport members between the infeed and discharge ends of the conveyor, said first drive to also move the turret away from the mold along the conveyor and move bottles on such vacuum plugs into the conveyor, and a drive member movable by the first drive as the bottles are moved into the conveyor and removably engageable with said bottle transport members during such movement to move said bottle transport member along the take-out conveyor with the bottles.

11. A take-out mechanism as in claim 10 including a third drive to move the drive member into and out of engagement with the bottle transport members.

12. A take-out mechanism as in claim 11 wherein said third drive is also to move the plugs above the take-away conveyor and out of bottles on the conveyor.

13. A take-out mechanism as in claim 12 wherein the strokes of said first and third drives are linear and are perpendicular.

14. A take-out mechanism for removing plastic bottles blown in a mold of blow molding machine, the take-out mechanism comprising a bottle transfer member, a bottle holder on the transfer member, a bottle take-away conveyor having an infeed end, a discharge end and bottle engaging members movable from the infeed end of the conveyor toward the discharge end of the conveyor for moving bottles along the conveyor, a first drive to move the bottle transfer member along a first linear stroke toward the mold to a position at the mold where the bottle holder engages a bottle in the mold and away from the mold along the take-away conveyor a distance from the infeed end toward the discharge end and position a bottle carried by said bottle holder in the take-away conveyor, and a second drive to move the bottle transfer member along a second linear stroke perpendicular to the first stroke and move the bottle holder out of engagement with the bottle in the discharge conveyor.

15. A take-out mechanism as in claim 14 including a third drive to rotate the bottle transfer member and alter the orientation of the bottle prior to movement of the bottle into the take-away conveyor.

16. A take-out mechanism as in claim 15 wherein said bottle holder comprises a vacuum plug.

17. A take-out mechanism as in claim 16 wherein the bottle holder comprises a rotary turret, said turret having a plurality of sides and including at least one vacuum plug extending outwardly from each such side.

18. A take-out mechanism as in claim 17 including a plurality of vacuum plugs extending outwardly form each side of the turret.

19. A take-out mechanism as in claim 18 wherein the turret is square and the third drive rotates the turret 90°.

20. A take-out mechanism as in claim 17 wherein said third drive rotates said turret through an angle equal to 360° divided by the number of sides of the turret.

* * * * *